United States Patent [19]
Matsuhashi et al.
[11] Patent Number: 4,830,466
[45] Date of Patent: May 16, 1989

[54] DRIVE SYSTEM FOR AN ACTIVE MATRIX LIQUID CRYSTAL DISPLAY PANEL HAVING DIVIDED ROW ELECTRODES

[75] Inventors: Nobuaki Matsuhashi, Tenri; Makoto Takeda, Nara; Hiroshi Take, Ikoma, all of Japan

[73] Assignee: Sharp Kabushiki Kaisha, Osaka, Japan

[21] Appl. No.: 839,196

[22] Filed: Mar. 13, 1986

[30] Foreign Application Priority Data

Mar. 15, 1985 [JP] Japan ........................ 60-52807

[51] Int. Cl.[4] .................. G02F 1/133; G09G 3/36
[52] U.S. Cl. ........................ 350/333; 340/784
[58] Field of Search .................. 350/332, 333, 336; 340/784, 802, 805, 765

[56] References Cited

U.S. PATENT DOCUMENTS

| | | | |
|---|---|---|---|
| 4,281,324 | 7/1981 | Nonomura et al. | 350/333 |
| 4,356,483 | 10/1982 | Fujita et al. | 350/331 R |
| 4,651,148 | 3/1987 | Takeda et al. | 340/805 |
| 4,724,433 | 2/1988 | Inoue et al. | 340/805 |

FOREIGN PATENT DOCUMENTS

| | | | |
|---|---|---|---|
| 3220958 | 12/1982 | Fed. Rep. of Germany . | |
| 0210415 | 11/1984 | Japan | 350/333 |
| 0039618 | 3/1985 | Japan | 350/332 |
| 2138615 | 10/1984 | United Kingdom | 340/784 |
| 2139795 | 11/1984 | United Kingdom | 350/333 |
| 2159656 | 12/1985 | United Kingdom | 340/784 |

OTHER PUBLICATIONS

Advances in Image Pickup and Displays, vol. 4, Academic Press 1981, pp. 61-63.

*Primary Examiner*—Stanley D. Miller
*Assistant Examiner*—Tai Van Duong
*Attorney, Agent, or Firm*—Birch, Stewart, Kolasch and Birch

[57] ABSTRACT

In an active matrix liquid crystal display panel, row electrodes are divided into two portions at the approximate center of the display panel, the left row electrode portion belonging to an odd number row electrode group, and the right row electrode portion to an even number row electrode group. One horizontal scanning is conducted for each pair of left and right row electrodes to write data signals in the display picture elements. The width of a pulse applied to each row electrode corresponds to one horizontal scanning period. There is a phase difference of about ½ the horizontal scanning period between the pulses for an odd number row electrode and an even number row electrode, thus minimizing the difference in a write period among the display picture elements in the lateral direction of the display panel.

3 Claims, 4 Drawing Sheets

DRIVE SYSTEM FOR AN ACTIVE MATRIX LIQUID CRYSTAL DISPLAY PANEL HAVING DIVIDED ROW ELECTRODES

BACKGROUND OF THE INVENTION

1. Field of the Invention

The present invention relates to an active matrix liquid crystal display panel, and more specifically to a drive system for an active matrix liquid crystal display panel in which an address switching transistor is connected to each of the picture elements for a matrix display pattern.

2. Description of the Prior Art

A thin film transistor (TFT) active matrix liquid crystal display device is known as a typical matrix liquid crystal display device involving nonlinear elements for driving the liquid crystal. This conventional display device incorporates address TFT's arranged in a matrix in the liquid crystal display panel, whereby the display device provides the same high contrast display as achieved by static drive even if it employs multiplex drive with a small duty ratio, i.e. with multiple lines.

The drive system of the TFT active matrix liquid crystal display device may have the circuit construction shown in FIGS. 1 and 3 and signal waveforms shown in FIG. 2. As shown in FIG. 1, a TFT 11*c* is connected to a liquid crystal display panel 11 at the intersection between a row electrode 11*a* and a column electrode 11*b*. A liquid crystal layer capacity is designated by 11*d*. A row electrode drive 12 is mainly composed of a shift register which shifts and outputs scanning pulses S sequentially to corresponding row electrodes by clocks $\phi$ sent from a gate signal control 13. When the total scanning period for the row electrodes is represented by T and the number of scanning lines by N, the scanning period H is expressed by the formula: $H=T/N$. A pulse voltage whose pulse width is equal to the scanning period H is applied to the row electrodes sequentially, thus turning ON the TFT's. A column electrode driver 14 comprises a shiaft register 16, sampling switches, etc. as shown in FIG. 3. The column electrode driver 14 samples data signals transmitted in series from a data signal control 15 and outputs them sequentially to the column electrodes in synchronization with clocks $\phi$ with timings corresponding to the respective column electrodes, so that the data signals are written in the liquid crystal layer through the TFT's 11*c*. This drive system, which sample-holds (SH) data signals directly in the display panel, is called a panel SH drive system.

In the panel SH drive system, data sampling and data writing in the liquid crystal layer through TFT's are conducted in the same horizontal scanning period. The period for writing data in the liquid crystal layer, therefore, ranges from 1H or 63.5 μs (one horizontal scanning period) to 11 μs (horizontal retrace period) for a television signal, for instance. Accordingly, the period allowed for writing data in the liquid crystal layer of display picture elements decreases at later sampling timing; the shortest write period is 11 μs.

To effect AC drive of the liquid crystal, the data signal applied for each scanning line reverses its polarity.

With the conventional drive system, as mentioned above, the liquid crystal write period becomes shorter at a later data sampling timing. When the time constant $T_{ON}$ which is the product of TFT ON resistance ($R_{ON}$) and liquid crystal layer capacity ($C_{LC}$) is not sufficiently small, the write period is sufficiently long at an earlier sampling timing, so that the liquid crystal layer can be charged through the TFT's with voltage applied to the column electrodes to a specified potential, but the write period decreases at a later sampling timing until the TFT's are finally turned OFF before the liquid crystal has been charged to the specified potential. In such a case, the old data cannot be rewritten completely. The potential applied to the liquid crystal layer is of in-between of the potentials of the old data and the new data. Consequently, data mixed with the old data is displayed on the panel. Thus, a difference in the write period among the display picture elements in the lateral direction of the display panel may result in a display picture of various definition.

OBJECTS AND SUMMARY OF THE INVENTION

Objects of the Invention

In view of the foregoing problems of the conventional matrix liquid rystal display panel drive system, it is the object of the present invention to provide a liquid crystal display panel drive system which permits the liquid crystal layer to be charged to a higher potential and minimize or eliminate any difference in the data write period among the picture elements along the lateral direction of the display panel.

Other objects and further scope of applicability of the present invention will become apparent from the detailed description given hereinafter. It should be understood, however, that the detailed description and specific examples, while indicating preferred embodiments of the invention, are given by way of illustration only. Various changes and modifications within the spirit and scope of the invention will become apparent to those skilled in the art from this detailed description.

SUMMARY OF THE INVENTION

The active matrix liquid crystal display panel drive system of the present invention, in which data is sample-held directly in the display panel, is characterized in that row electrodes connected with address switching transistor gates are divided into two portions at the approximate center of the display panel, so that laterally elongated row electrodes extend from both ends to the approximate center of the display panel, and that one horizontal scanning is conducted for each pair of laterally adjacent row electrodes.

Since one horizontal scanning is conducted for each pair of laterally adjacent row electrode divided at the approximate center of the display panel, the period for writing data signals in the liquid crystal layer can be increased to permit a higher potential charge for the liquid crystal layer, and the difference in write period is minimized among the display picture elements along the lateral direction of the display panel, thus enhancing the display definition. Furthermore, according to the present invention, it is possible to turn ON the switching transistors synchronously with a display picture element having the shortest write period so that the write period is uniform. As a result, the difference in write period among the picture elements in the lateral direction of the display panel is eliminated, thus improving display definition.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

An example described below is an application of a liquid crystal display panel drive system of the present invention to a liquid crystal television set.

Figure 1:
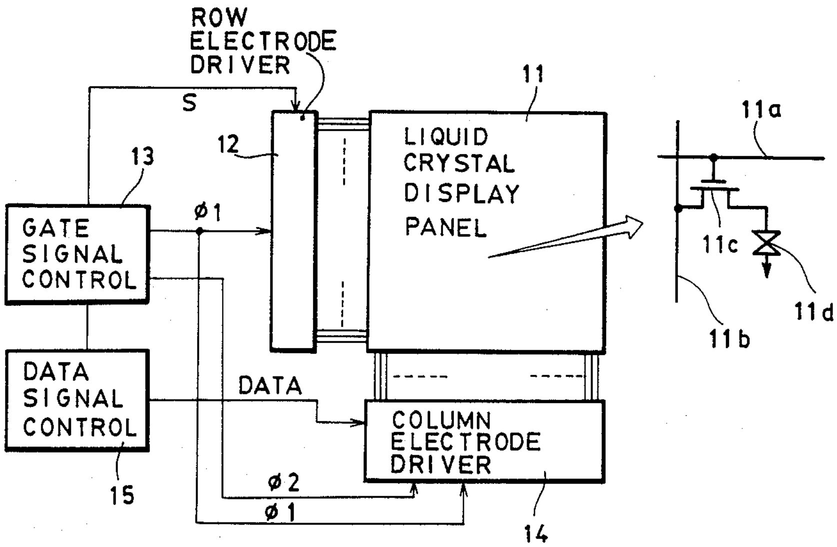
FIG.1 PRIOR ART
FIG. 1 is a schematic block diagram of a conventional liquid crystal display device.
Figure 2:
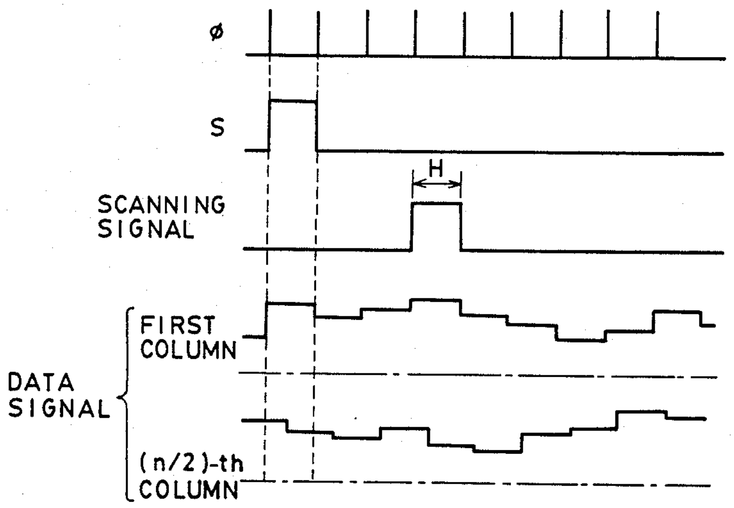
FIG.2 PRIOR ART
FIG. 2 is a timing chart showing various signals occurring within the conventional liquid crystal display device of FIG. 1.
Figure 3:
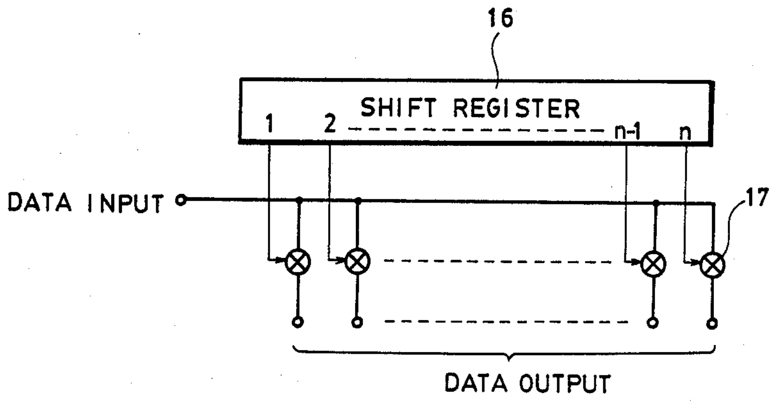
FIG.3 PRIOR ART
FIG. 3 is a block diagram of an essential part of the conventional liquid crystal display device of FIG. 1.
Figure 4:
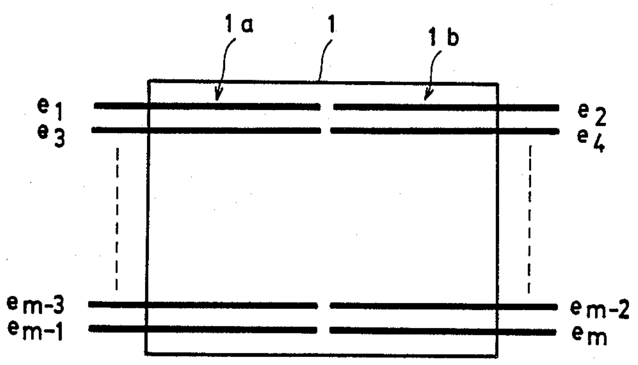
FIG. 4 is a schematic plan view of an embodiment of a liquid crystal display panel of the present invention.

FIG. 4 shows the structure of the row electrodes of a liquid crystal display panel. The laterally elongated row electrodes are divided into two portions at the approximate center of the display panel 1, so that the row electrodes 1*a* and 1*b* extend in pairs from both lateral ends toward the approximate center of the display panel 1. The left side row electrodes 1*a* constitute odd number row electrodes $e_1$, $e_3$, . . . , and $e_{m-1}$, and the right side row electrodes 1*b* constitute even number row electrodes $e_2$, $e_4$, . . . , and $e_m$. The row electrodes $e_1$, $e_2$, . . . , and $e_m$ are connected with address switching transistors (not shown) at the intersections with column electrodes (not shown). One horizontal scanning operation is carried out for each pair of adjacent row electrodes 1*a* and 1*b*, or specifically for the row electrodes $e_1$ and $e_2$. The row electrode $e_1$ provides a display for the former half of the horizontal scanning operation (1H), and the row electrode $e_2$ provides a display for the latter half.

Figure 5:
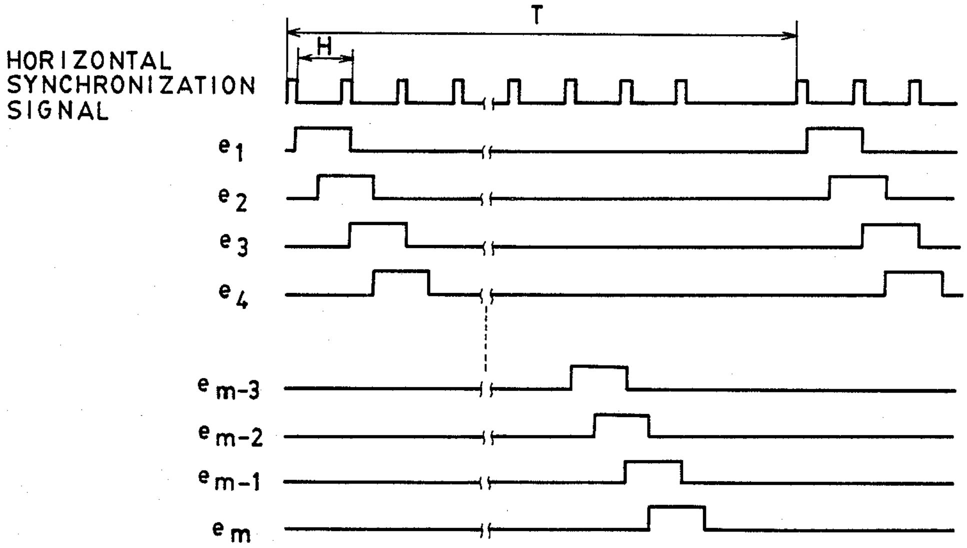
FIG. 5 is a timing chart showing gate signals occurring within an embodiment of a liquid crystal display device of the present invention.
Figure 6:
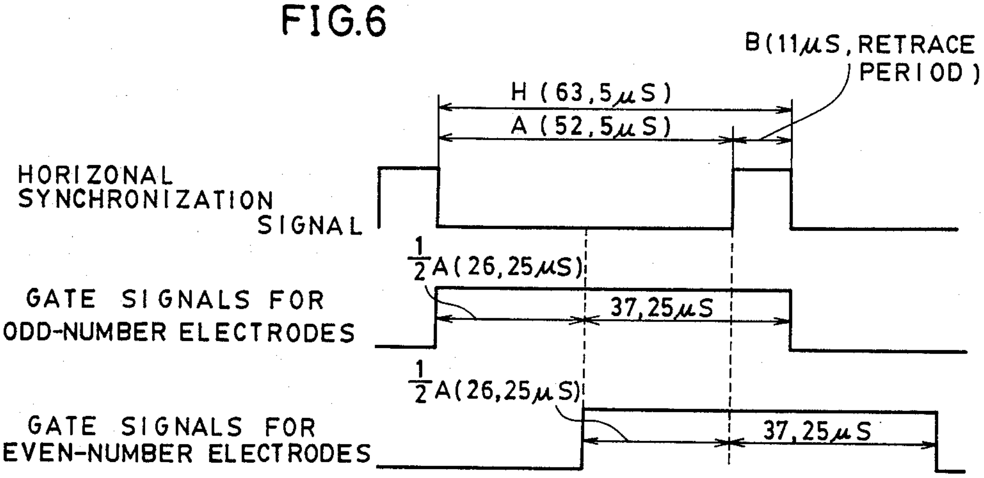
FIG. 6 is a detailed timing chart of the gate signals of FIG. 5.

FIGS. 5 and 6 show waveforms of switching transistor gate signals applied from a row electrode driver (not shown) to the row electrodes $e_1$, $e_2$, . . . , and $e_m$. The gate signals have a pulse width of 1H period (63.5 μs). The gate signal for an odd number row electrode 1*a* is synchronized with a falling edge of the horizontal synchronization signal, whereas the gate signal for an even number row electrode 1*b* is synchronized with the center of a low level period A of the horizontal synchronization signal. In other words, the pulses applied to the laterally adjacent row electrodes 1*a* and 1*b* are different in phase by about ½ the horizontal scanning period. A data signal is sampled by a column electrode driver (not shown) for the former ½ A period (26.25 μs) of a pulse and the data signal is written in the liquid crystal layer for the remaining 37.25 μs period.

The write period for the liquid crystal layer ranges from 63.5 μs to 37.25 μs. According to the present invention, therefore, the shortest write period is 37.25 μs, compared to 11 μs in the conventional drive system. Consequently, compared with the conventional drive system, the present invention can permit a longer period for writing data signals in the liquid crystal layer and effect a smaller difference between the minimum and maximum write periods, so that the liquid crystal layer is charged to a higher potential and the difference in the write period among the picture elements in the lateral direction of the display panel is minimized.

Figure 7:
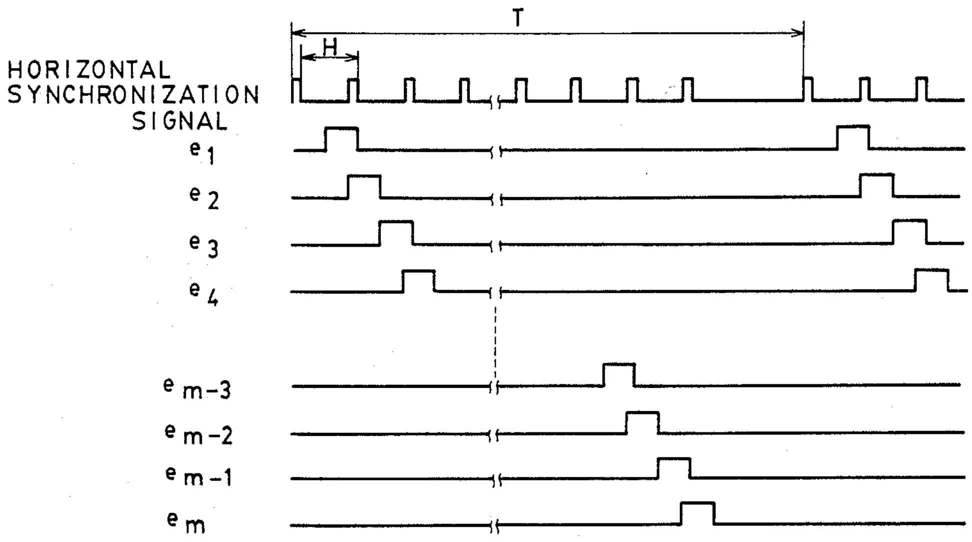
FIG. 7 is a timing chart showing gate signals occurring within another embodiment of a liquid crystal display device of the present invention.
Figure 8:
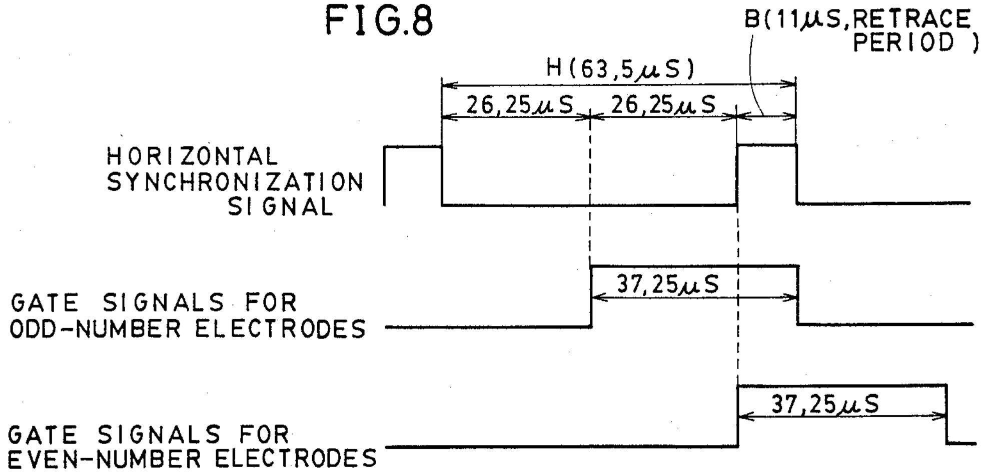
FIG. 8 is a detailed timing chart of the gate signals of FIG. 7.

FIGS. 7 and 8 show another example of switching transistor gate signals applied to the row electrodes $e_1$, $e_2$, . . . , and $e_m$. The gate signals turn ON the switching transistors synchronously with a display picture element whose write period is the shortest. The gate signals have a pulse width of a 37.25 μs period or about ½ the horizontal scanning period 1H (63.5 μs). The gate signals for an odd number row electrode 1*a* is synchronized with the center of a low level period of the horizontal synchronization signal, whereas the gate signal for an even number row electrode 1*b* is synchronized with a rising edge of the horizontal synchronization signal.

In this second example, every time the data signal has been sampled for ½H period, pulses are applied to the row electrodes 1*a* and 1*b*, turning ON the switching transistors. Accordingly, the period for writing data signals in the liquid crystal layer through the switching transistors is uniformly 37.25 μs or about ½H period for the row electrodes. A difference in the write period among laterally aligned display picture elements is thus eliminated.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An active matrix liquid crystal display panel drive system where data is sampled and held directly in the display panel, comprising:

row electrodes connected with address switching transistor gates, each row electrode divided into two separate electrodes at an approximate center of the display panel so that laterally divided row electrodes extend from both ends of the display panel toward the approximate center of the display panel, each laterally divided electrode of a row forming a pair, and wherein each said pair of laterally divided row electrodes is scanned in a single horizontal scanning period.

2. The active matrix liquid crystal display panel drive system as claimed in claim 1, wherein pulses each having a width corresponding to said single horizontal scanning period are applied to said pairs of laterally divided row electrodes with a phase difference of about ½ the horizontal scanning period.

3. The active matrix liquid crystal display panel drive system as claimed in claim 1, wherein a pulse with a width of ½ of said single horizontal scanning period is applied to each of the row electrodes every time data signals have been sampled for ½ of said single horizontal scanning period so as to assure that ½ of said single horizontal scanning period is used for writing the data signals in a liquid crystal layer.

* * * * *